United States Patent
Hamahata

(10) Patent No.: US 8,072,173 B2
(45) Date of Patent: Dec. 6, 2011

(54) SERVO MOTOR MONITORING APPARATUS

(75) Inventor: Mitsuharu Hamahata, Toyama (JP)

(73) Assignees: Nachi-Fujikoshi Corp., Toyama-shi (JP); Daihen Corporation, Osaka-shi (JP)

(*) Notice: Subject to any disclaimer, the term of this patent is extended or adjusted under 35 U.S.C. 154(b) by 217 days.

(21) Appl. No.: 12/307,082

(22) PCT Filed: Jun. 26, 2007

(86) PCT No.: PCT/JP2007/062784
§ 371 (c)(1),
(2), (4) Date: Dec. 30, 2008

(87) PCT Pub. No.: WO2008/007541
PCT Pub. Date: Jan. 17, 2008

(65) Prior Publication Data
US 2009/0309531 A1   Dec. 17, 2009

(30) Foreign Application Priority Data
Jul. 10, 2006 (JP) .................................. 2006-189599

(51) Int. Cl.
G05B 23/02 (2006.01)
(52) U.S. Cl. ................. 318/565; 318/400.2; 318/400.35
(58) Field of Classification Search .................. 318/565, 318/400.2, 400.35, 400.08, 445, 727, 807, 318/400.01, 400.21, 400.33, 400.09, 400.34, 318/719, 716
See application file for complete search history.

(56) References Cited

U.S. PATENT DOCUMENTS
2010/0090632 A1* 4/2010 Maekawa ................. 318/400.33

FOREIGN PATENT DOCUMENTS

| JP | 60-104695 | 6/1985 |
|---|---|---|
| JP | 04-067209 | 3/1992 |
| JP | 9-47074 | 2/1997 |
| JP | 10-264080 | 10/1998 |
| JP | 10-315173 | 12/1999 |
| JP | 2001-224130 | 8/2001 |
| JP | 2002-262591 | 9/2002 |
| JP | 2004-96880 | 3/2004 |
| JP | 2004-181543 | 7/2004 |
| JP | 2005-335591 | 12/2005 |

OTHER PUBLICATIONS

Translation of Notification of Reasons of Refusal dated Aug. 3, 2010.
International Search Report corresponding to PCT/JP2007/062784 with an English language translation thereof.
Translation of Decision of Refusal issued in the Japanese Patent Application No. 2006-189599 dated Jun. 28, 2011.

* cited by examiner

Primary Examiner — Karen Masih
(74) Attorney, Agent, or Firm — Venable LLP; Jeffri A. Kaminski

(57) ABSTRACT

Disclosed a servo motor monitoring apparatus including: a magnetic pole position calculating member to extract a magnetic pole position signal of the servo motor from a motor drive line connected to the servo motor; a present position signal inputting member to receive an input of a present position signal from the position detecting member attached to the servo motor; and a monitoring member to compare operations of the servo motor based on two types of signals of the magnetic pole position signal and the present position signal of the servo motor, and to output a stop instruction signal for cutting off a power supply to the servo motor when detecting disagreement.

10 Claims, 8 Drawing Sheets

SERVO MOTOR MONITORING APPARATUS

CROSS-REFERENCE TO RELATED APPLICATIONS

This application is a 371 of PCT/JP2007/062784 filed on Jun. 26, 2007, which claims the priority of Japanese Patent Application No. 2006-189599, filed on Jul. 10, 2006, the subject matters of which are incorporated herein by reference.

TECHNICAL FIELD

The present invention relates to an operation monitoring apparatus for a servo motor used in an industrial robot.

BACKGROUND OF THE INVENTION

An industrial robot is generally configured such that an arm including a plurality of joints is connected to a robot main body and a tool is provided at a tip of the arm. A servo motor is attached to the robot main body, and a position detecting member is attached to the servo motor. A servo control section controls a tool position, arm position, arm angle and the like based on present position information of the tool detected by the position detecting member.

As a method for monitoring an operation of the robot, for example, there has been disclosed a conventional technique of an invention of the patent application by the applicant of the subject application, in other words, a method for detecting an abnormality by comparing a difference between an instruction position received from a position control section and a present position input from the position detecting member with a threshold value corresponding to an instruction speed (for example, see Patent document 1).

Moreover, by developing the above conventional technique, there has been disclosed a method for detecting an abnormality with higher accuracy by modeling an operation of a robot arm so as to suppose an actual position based on the instruction position from the position control section to compare the supposed actual position with the present position input from the position detecting member (for example, see Patent documents 2 and 3).

Patent document 1: Japanese Patent Application Laid-Open Publication No. Hei 4-67209
Patent document 2: Japanese Patent Application Laid-Open Publication No. Hei 10-315173
Patent document 3: Japanese Patent Application Laid-Open Publication No. 2004-181543

DISCLOSURE OF THE INVENTION

Problem to be Solved by the Invention

However, though these methods where the operation is monitored based on the difference between the instruction position and the present position are suitable for being used to receive the input of the instruction position and to allow the servo control section to drive the motor so as to monitor whether or not the present position has operated according to the instruction position as a result of the control, these methods are not suitable for monitoring whether or not the present position is within the allowable range.

Specifically, the servo control section of recent years uses a microcomputer so that a control can be freely switched, and there is a problem that a properness of the present position value can not evaluated based on the difference between the instruction position and the present position when the serve control section performs processing such as, for example, performing a correction control to create a curve for smoothing a change of acceleration and deceleration in the servo control section so that the servo motor and robot can easily follow the change when the instruction position changes in a staircase pattern, predicting an under-shoot and over-shoot based on a change of the present position to correct the instruction position to operate, and switching the motor so as to operate at a constant speed or at a constant output torque in a part of the operation.

Moreover, for full preparation for monitoring the present position, a concept of a duplicated monitoring with respect to an independent signal is preferably applied. When the present position signal is duplicated by two position detecting members, a certification of independence is not troublesome, but by using the two position detecting member, an extra cost is necessary, a failure rate becomes twice as high, and a reliability of the apparatus goes down.

The present invention is achieved in view of above problems to realize an abnormality detection of an operation of the serve motor without duplicating the position detecting member or being influenced by a complicacy of a configuration of the serve control section.

Means for Solving Problems

Embodiments of the invention may have a configuration of a servo motor monitoring apparatus equipped in a servo motor control apparatus which controls a servo motor based on a present position detected by a position detecting member attached to the servo motor, the servo motor monitoring apparatus including: a magnetic pole position calculating member to extract a magnetic pole position signal of the servo motor from a motor drive line connected to the servo motor; a present position signal inputting member to receive an input of a present position signal from the position detecting member attached to the servo motor; and a monitoring member to compare operations of the servo motor based on two types of signals of the magnetic pole position signal and the present position signal of the servo motor, and to output a stop instruction signal for cutting off a power supply to the servo motor when detecting disagreement.

Embodiments of the invention may have the same configuration as above, and a configuration where the monitoring member includes a speed calculating member to calculate speeds based on changes of the magnetic pole position signal and the present position signal respectively, compares the obtained speeds with each other, and outputs the stop instruction signal for cutting off the power supply to the servo motor when detecting disagreement.

Embodiments of the invention may have the same configuration as above, and a configuration wherein the magnetic pole position calculating member includes: a magnetic pole position signal extracting member connected to the motor drive line; and a magnetic pole position signal converting member to convert the extracted magnetic pole position signal into a predetermined numerical value for specifying a motor axis angle.

Embodiments of the invention may have the same configuration as above, and a configuration wherein the magnetic pole position calculating member includes: a rotation amount counting member to count a rotation of the magnetic pole position indicated by the magnetic pole position signal as a rotation amount whenever the magnetic pole position takes a round.

Embodiments of the invention may have the same configuration as above, and a configuration wherein magnetic pole position signal extracting member includes: a resistance bridge circuit composed of three resistance elements respectively connected to three motor drive lines; and a comparator circuit to convert a sine wave signal extracted from the resistance bridge into a rectangular wave.

Embodiments of the invention may have the same configuration as above, and a configuration wherein the magnetic pole position calculating member includes: a motor drive current signal inputting member to obtain a motor drive current signal flowing through the motor drive line; and a magnetic pole position signal converting member to extract a magnetic position as an electrical angle signal component from the motor drive current signal.

Embodiments of the invention may have the same configuration as above, and a configuration wherein the magnetic pole position calculating member includes: a drive current detecting member to detect motor drive currents of at least two of the motor drive lines among the three motor drive lines, and wherein the magnetic pole position signal converting member is a calculating member to obtain the magnetic pole position by an arithmetic operation from the two motor drive current signals on the assumption that each of the motor drive currents flowing through the three motor drive lines is a function of a phase of the magnetic pole position or a function of a phase having a phase difference at a constant interval from the magnetic pole position.

Embodiments of the invention may have the same configuration as above, and a configuration of the servo motor monitoring apparatus being equipped in a servo motor control apparatus which controls each servo motor of a robot including an arm section composed of a plurality of arms connected with one another by a plurality of joints, the servo motor provided in each of the joints, and a tool equipped at a tip of the arm section, the servo motor monitoring apparatus includes: a coordinate position calculating member to calculate a tool position or a position of a predetermined region of the arm section based on the present position signal of each of the servo motor; a work area storing member to store an operable area or an inoperable area of the robot; and a work area monitoring member to output an instruction signal for cutting off the power supply to each of the servo motor when the tool position or the position of the predetermined region calculated by the coordinate position calculating member reaches outside of the operable area or inside of the inoperable area.

Embodiments of the invention may have the same configuration as above, and a configuration of the servo motor monitoring apparatus being equipped in a servo motor control apparatus which controls each servo motor of a robot including an arm section composed of a plurality of arms connected with one another by a plurality of joints, the servo motor provided in each of the joints, and a tool equipped at a tip of the arm section, the servo motor monitoring apparatus includes: a coordinate position calculating member to calculate a tool position or a position of a predetermined region of the arm section based on the present position signal of each of the servo motor; a movement speed calculating member to calculate a movement speed of the tool position or the arm section based on a difference of time-series data of the tool position or the position of the predetermined region of the arm section; a limiting speed storing member to store an upper limit of the movement speed at which the robot is operable; and a limiting speed monitoring member to output an instruction signal for cutting off the power supply to each of the servo motor when the calculated movement speed of the tool position or the predetermined region exceeds the upper limit of the movement speed at which the robot is operable.

Embodiments of the invention may have the same configuration as above, and a configuration of the servo motor monitoring apparatus including: a calculation result collating member to monitor an operation of at least one of the servo motors by processings of two calculation processing sections individually, and to output an instruction signal for cutting off the power supply to each of the servo motor when calculation processing results by the two calculation processing sections disagree.

Effect of the Invention

According to embodiments of the invention, in controlling the servo motor, the monitoring member extracts the magnetic pole position signal of the servo motor from the motor drive line to compare the magnetic pole position with the present position from the position detecting member of the servo motor so as to perform a stop judgment of the servo motor due to an abnormality occurrence. Thus, for example, even when a target value such as an instruction position is corrected during a controlling step of the servo motor, the magnetic pole position signal in which the correction is reflected is compared with the present position signal, and occurrences of abnormalities of the servo motor itself, the position detecting member, and the monitoring apparatus itself can be detected without being influenced by the complexity of the configuration of the servo control section in the case of performing the correction, or being influenced by the correction, so that the servo motor can be stopped properly. Moreover, it becomes possible to compare the operations of the servo motor based on the two types of signals of the magnetic pole position signal and the present position signal of the servo motor to detect an abnormality without providing two position detecting members.

Incidentally, the present invention may be applied not only to the servo motor control apparatus which performs a feedback control based on the instruction position of the servo motor, but also to the servo motor control apparatus which performs an impedance control based on modern control theory with a speed input amplifier as the servo control section or a torque input amplifier as the servo control section, and the like, for example.

According to embodiments of the invention, since the monitoring member monitors a speed of the servo motor by comparing a speed based on the magnetic pole position signal with a speed based on the present position, an abnormality detection can be performed from a view point of not only an operation position of the servo motor but also the speed thereof, and more appropriately abnormality detection of the servo motor can be performed.

Incidentally, this invention embodiments may have a configuration which outputs a stop instruction signal when abnormalities are detected in both of position comparison and speed comparison, and more preferably has a configuration which outputs the stop instruction signal when an abnormality is detected in at least one of position comparison and speed comparison.

According to embodiments of the invention, since the magnetic pole position signal is converted into a predetermined numerical value for specifying a motor axis angle, unlike the case of performing a comparison by an analog signal, an influence such as a noise due to a disturbance can be reduced so that an abnormality detection can be performed more properly and stably.

Incidentally, the predetermined numerical value for specifying the motor axis angle may be obtained, for example, as a value of the motor axis angle itself, or by dividing one round of the axis into a plurality of sections and expressing by a numerical value which of the sections the axis belongs to.

According to embodiments of the invention, since the rotation amount counting member is provided, an abnormality detection can be performed by judging not only an axis position but also an agreement of the number of rotations, and thereby more appropriately abnormality detection of the servo motor can be performed.

According to embodiments of the invention, since the resistance bridge circuit and the comparator circuit are used, a simplification of the apparatus and cost reduction can be realized, and since the rectangular wave is used for judging, an amount of information to be processed can be reduced and an acceleration of the processing can be realized.

According to embodiments of the invention, since the magnetic pole position signal converting member extracts the magnetic pole position as the electrical angle signal component from the motor drive current signal, the axis position can be detected by segmentalized angle unit, and thereby more appropriately abnormality detection of the servo motor can be performed.

According to embodiments of the invention, since the magnetic pole position is obtained by an arithmetic operation based on at least two of the motor drive current signals, focusing on the fact that the motor drive current is a function of a phase of the magnetic pole position, an abnormality detection can be performed by easy calculating processing, and thereby a simplification of the configuration for detecting an abnormality and an acceleration of the processing can be performed.

According to embodiments of the invention, the operation of the robot to an unforeseen area can be prevented, in addition to the operation abnormality detection of the robot, and thereby the operation control of the robot can be improved.

According to embodiments of the invention, since the operation of the robot in an excessive speed can be prevented, in addition to the operation abnormality detection of the robot, the operation control of the robot can be improved.

According to embodiments of the invention, since the operation of the servo motor is monitored by processings of two calculation processing sections individually, and since the instruction signal for cutting off the power supply to each of the servo motor is output when the calculation processing results disagree, it becomes possible to perform monitoring the operation of the servo motor by two systems without providing two position detection members, and the operation of the robot can be stopped even when an abnormality occurs in any one of monitoring systems themselves, and thereby more appropriately abnormality detection of the servo motor and the robot can be performed

BEST MODE TO CARRY OUT THE INVENTION

First Embodiment

Servo Motor Control Apparatus

Hereinafter, a content of the first embodiment of the present invention will be described with reference to the drawings.

Figure 1:
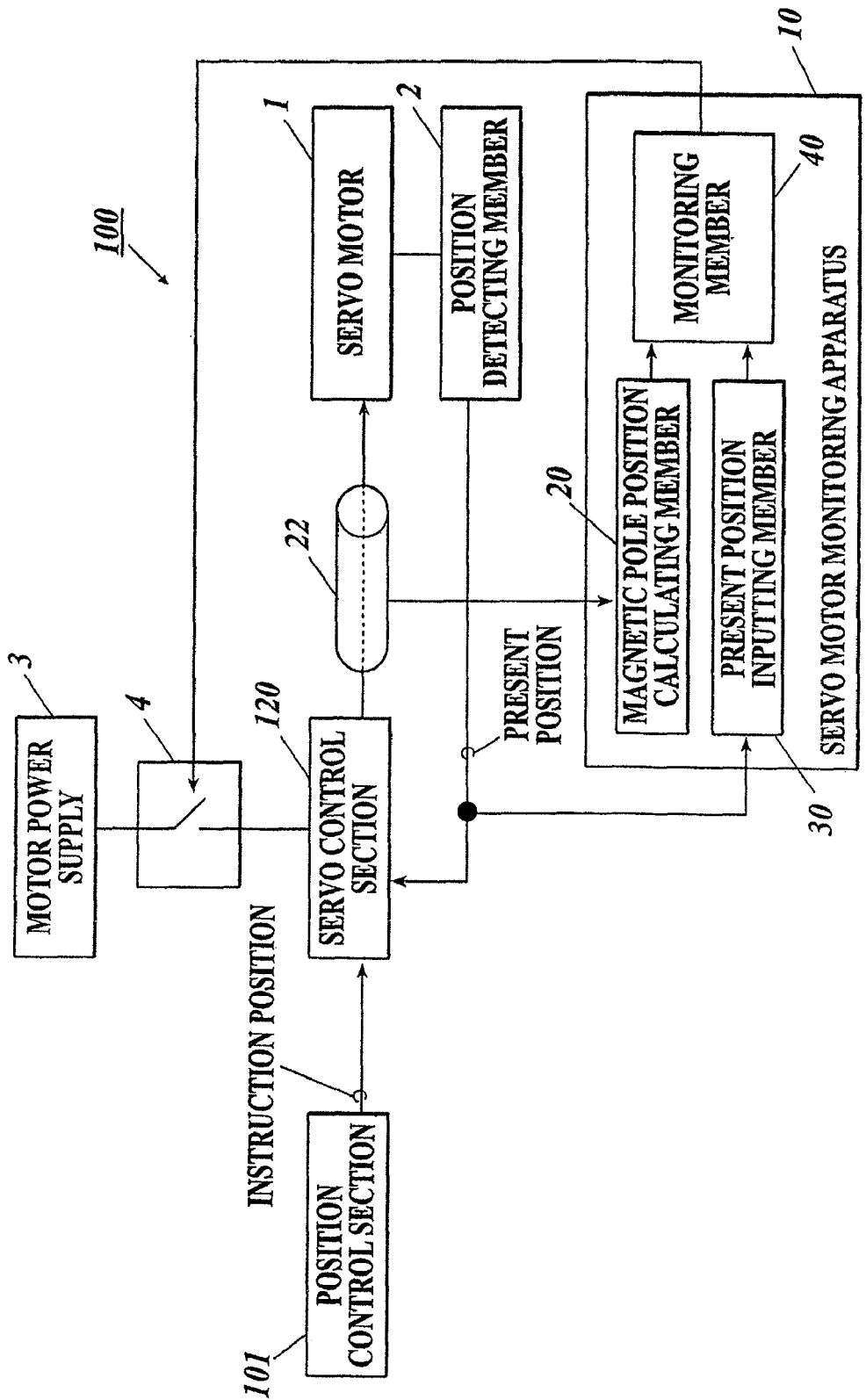
FIG. 1 is a configuration diagram of a servo motor control apparatus equipped with a servo motor monitoring apparatus of the invention of the subject application.

FIG. 1 is a configuration diagram of a servo motor control apparatus 100 equipped with a servo motor monitoring apparatus 10 of the invention of the subject application.

The servo motor control apparatus 100 includes: a position control section 101 to create time-series data of an instruction position; a servo control section 120 to output motor drive current for driving a servo motor 1 depending on a deviation between an instruction position indicated by the time-series data and a present position of the present servo motor 1 detected by a position detection member 2 attached to the servo motor 1; and a servo motor monitoring apparatus 10 to monitor an operation of the servo motor 1 to output a stop signal for cutting off a power supply into an emergency stop switch 4 provided between a motor power supply source (electrical source) 3 and the servo control section 120 under a predetermined condition.

(Servo Control Section)

Figure 2:
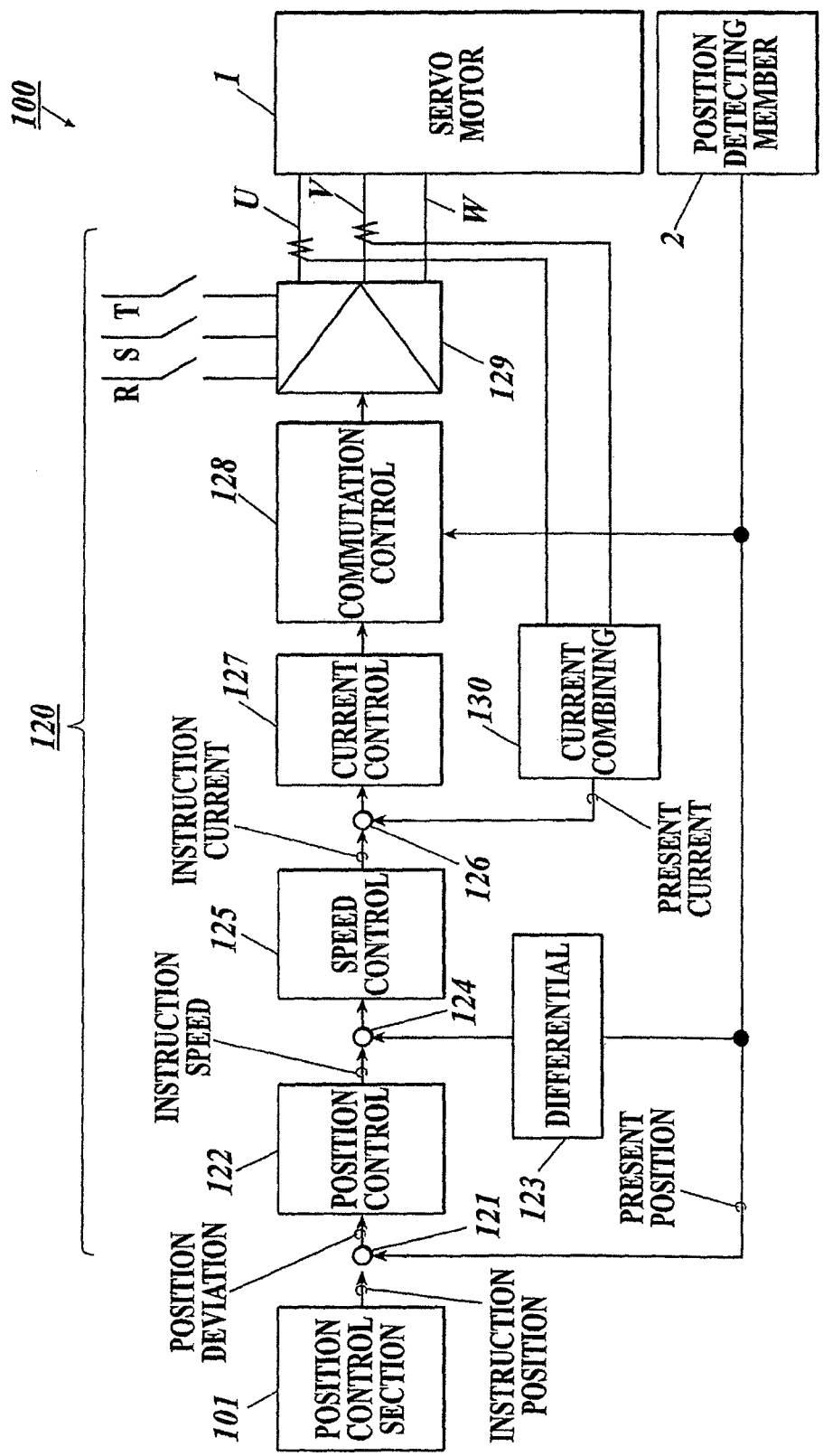
FIG. 2 is a block diagram showing a feedback control system configured with a servo control section.

FIG. 2 is a block diagram showing a feedback control system configured with the above servo control section 120.

In the control system of the servo motor control apparatus 100, each of a position control, speed control and current control is configured by PID (proportional-integral-derivative) control.

In other words, the servo control section 120 includes: a subtractor 121 to subtract the present position based on the position detecting member 2 from the instruction position based on the position control section 101 to obtain a position deviation; a position control section 122 to obtain an instruction speed so that the position deviation becomes zero; a differentiator 123 to differentiate the present position signal to obtain a present speed signal; a subtractor 124 to subtract the present speed signal from an instruction speed signal to obtain a speed deviation; a speed control section 125 to obtain an instruction current signal (torque signal) so that the speed deviation becomes zero; a subtractor 126 to subtract a present current signal to be hereinafter described from the instruction current signal to obtain a current deviation; a current control section 127 to control current so that the current deviation becomes zero; a commutation control section 128 to divide current into three motor drive lines U, V, W which apply current to three motor windings provided in the servo motor 1; a driver 129 to convert the current into high current of drive level to apply it to the motor drive lines U, V, W; and a current combining section 130 to detect currents flowing through the motor drive lines U, V to combine them to input the combined present current signal to the subtractor 126.

In other words, a block configuration of the servo control section 120 is a basic and general configuration for performing a feedback control by the PID control.

The servo control section 120 is composed of a microcomputer provided with each of the above-described configurations. Moreover, for example, the servo control section 120 may add in the microcomputer a correction processing section which performs a correction to create a curve of acceleration and deceleration so as to smooth a speed change with respect to an input of the instruction position in a staircase pattern, corrects the instruction position by predicting occurrences of an under-shoot and over-shoot based on a change of the present position, and switches the motor so as to operate at a constant speed or at a constant output torque in a part of the operation.

(Servo Motor)

Figure 3:
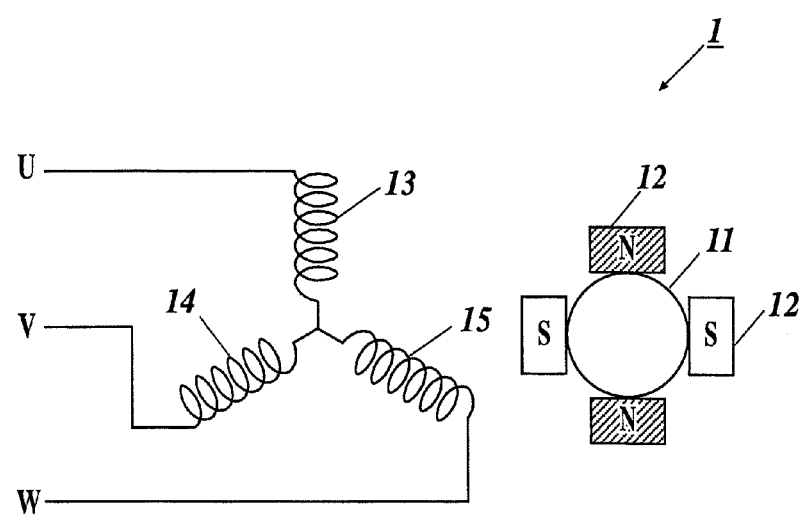
FIG. 3 is an explanatory diagram schematically showing a servo motor to be controlled.

FIG. 3 is an explanatory diagram schematically showing the servo motor 1 to be controlled. The servo motor 1 is a brushless DC motor which includes: a rotator 11 to rotate; a permanent magnet 12 fixedly equipped in the rotator 11; armature windings 13, 14, 15 respectively connected to the motor drive lines U, V, W, and which motor rotates by applying the motor drive current to the three armature windings 13, 14, 15. The three armature windings 13, 14, 15 are in practice located at 120 degree intervals so as to surround the rotator 11 and the permanent magnet 12.

The rotator 11 to which the magnet 12 is attached is an output axis of the servo motor 1, to which axis the position detecting member 2 (for example, a resolver or a position detector of an optical/magnetic encoder) is attached.

(Servo Motor Monitoring Apparatus)

Figure 4:
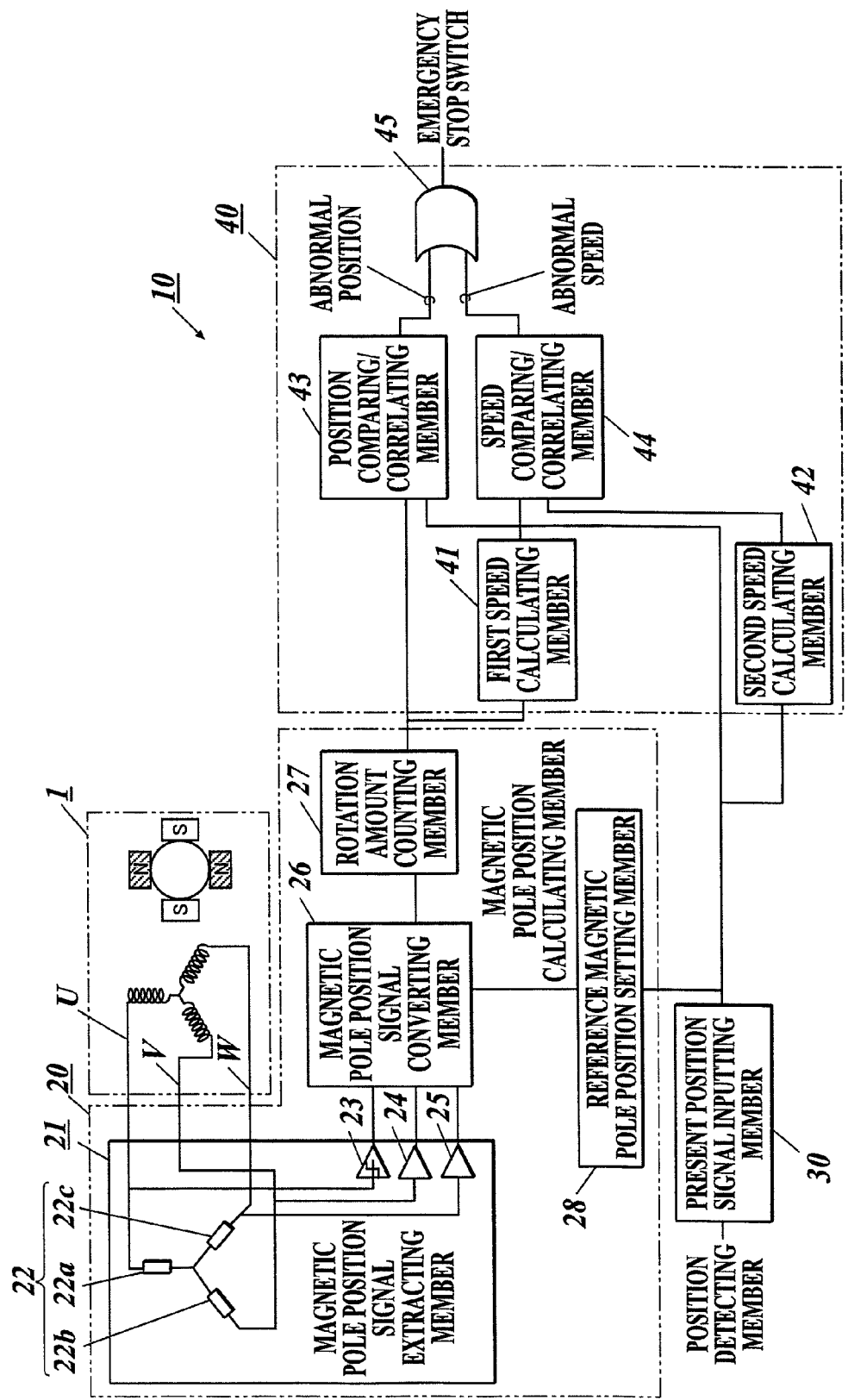
FIG. 4 is a configuration diagram of a more detailed configuration of the servo motor monitoring apparatus.

FIG. 4 is a configuration diagram of a more detailed configuration of the servo motor monitoring apparatus 10. The servo motor monitoring apparatus 10 includes: a magnetic pole position calculating member 20 to extract a magnetic pole position signal of the servo motor 1 from the motor drive lines U, V, W; a present position signal inputting member 30 to receive an input of the present position signal from the position detecting member 2 attached to the servo motor 1; and a monitoring member 40 to compare/contrast the operation of the servo motor 1 by two types of signals of the magnetic pole position signal and present position signal of the servo motor 1, and to output a signal for cutting off a power supply into the motor when a disagreement is detected.

The magnetic pole position calculating member 20 includes: a magnetic pole position signal extracting member 21 to extract a magnetic pole position signal from the motor drive lines U, V, W; a magnetic pole position signal converting member 26 to convert the extracted magnetic pole position signal into a predetermined numerical value for specifying a motor axis angle; a rotation amount counting member 27 to count a rotation of the magnetic pole position indicated by the magnetic pole position signal as a rotation amount whenever the magnetic pole position takes a round; and a reference magnetic pole position setting member 28 to set a reference magnetic pole position for identifying a magnetic pole position signal at the time when the servo motor 1 accelerates or decelerates, based on the present position signal.

The magnetic pole position signal extracting member 21 includes: a resistance bridge circuit 22 to collectively connect one edge portions of resistance elements 22a, 22b, 22c another edge portions of which are respectively connected to the motor drive lines U, V, W of the servo motor 1; and comparators 23, 24, 25 to binarize a wave shape of a signal flowing through each of the resistance elements 22a, 22b, 22c.

Figure 5:
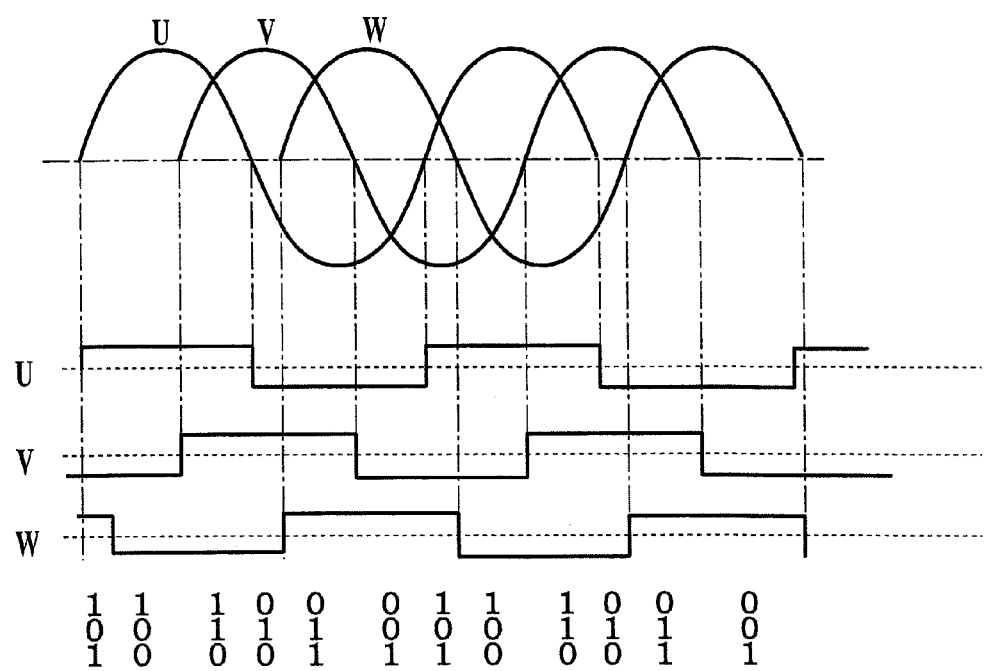
FIG. 5 is a diagram showing a signal which occurs in each armature winding when a rotator of the servo motor rotates, and the signal binarized by each comparator so as not to be influenced by amplitude.

An upper diagram on FIG. 5 shows a signal which occurs in each of the armature windings 13, 14, 15 when the rotator 11 of the servo motor 1 rotates. In this case, the serve motor 1 operates as a power generator, and sine wave signals having 120 degree phase lags one another occur respectively in each of the armature windings 13, 14, 15. The faster rotation speed is, the larger an amplitude of the sine wave becomes, and the larger a frequency of the sine wave becomes in proportion to the speed. Moreover, when the servo motor 1 is driven to perform a torque output, the servo motor 1 can rotate by applying current to each of the motor drive lines U, V, W from the driver 129 in a phase relation and a current divide ratio which correspond an induced voltage wave shape operating as the above-described power generator.

Since characteristics of these motors are described in detail in technical document "AC SABO SHISUTEMU NO RIRON TO SEKKEI NO ZISSAI (Facts of theory and design of AC servo system)" (Sougou-Denshi Publishing Co., Ltd, 1990) for example, a detailed explanation thereof is omitted.

A lower diagram on FIG. 5 shows an analog signal of the sine wave occurring in each of the armature windings 13, 14, 15, which signal is binarized by each of the comparators 23, 24, 25 so as not to be influenced by an amplitude.

The magnetic pole position signal converting member 26 converts a three-bit signal of the signals of the three lines U, V, W, which signals are output from the comparator circuits 23, 24, 25, into a binary digit corresponding to the rotation degree (this method is a converting method well known as a gray-binary). In other words, when a high level is expressed by one (1) and a low level is expressed by zero (0), the magnetic pole position signal converting member 26 performs outputting sequentially from binary digit expression 101 where the signal of zero (0) or one (1) is aligned in order of UVW, with the rotation, like "100, 110, 010, 011, 001, 101 . . . ".

By this, it becomes possible to divide one cycle of the sign wave into six portions and to recognize which position the rotator 11 is in.

Incidentally, a meaning of the wave shape in the upper diagram on FIG. 5, which wave shape occurs in the motor power line in an operation pattern of the servo motor 1, goes as follow. When a motor drive power source is supplied from the driver 129, a wave pattern of drive current occurs, and the magnetic pole position instructed by driving side is detected. Since the signals at the time of acceleration and deceleration in driving are positive or negative so as to be inverted and have a difference of 180 degree each other, it is necessary to judge those.

For this reason, the reference magnetic pole position setting member 28 sets a reference magnetic pole position signal of each of the UVW phases based on the present position input from the present position signal inputting member 30 to input it to the magnetic pole position signal converting member 26. In other words, the reference magnetic pole position setting member 28 obtains a binary digit value (any one of 101, 100, 110, 010, 011, 001) based on the wave pattern of the drive current which may occur in each of the motor drive lines U, V, W when the servo motor 1 is at the present position detected by the position detecting member 2 to input the value into the magnetic pole position signal converting member 26.

On the other hand, when the binary digit value (suppose it is α) based on the magnetic pole position is input from the magnetic pole position signal extracting member 21, the magnetic pole position signal converting member 26 calculates a binary digit value (suppose it is β) based on an inverted magnetic pole position, a phase of which value has a difference of 180 degree from the value α, compares each of the value α based on the magnetic pole position and the value β based on the inverted magnetic pole position with a value (suppose it is γ) based on the present position input from the reference magnetic pole position setting member 28, and judges which of the value α and the value β has more digit numbers which correspond to those of the value γ. When the value α has more digit numbers corresponding to those of the value γ, it is then judged that the servo motor 1 is accelerating, and the value α is input as the magnetic pole position into the monitoring member 40. When the value β has more digit numbers corresponding to those of the value γ, it is then judged that the servo motor 1 is decelerating, and the value β is input as the magnetic pole position into the monitoring member 40.

Incidentally, for example, when rotating by an external force such as a gravitational force or rotating at a constant speed by an inertia moment when the drive current does not flow, the magnetic pole position is detected by an induced voltage wave pattern of the motor operating as the power generator.

Moreover, the rotation amount counting member 27 increments (+1) a count value of the rotation amount at the time when the binary digit signal input from the magnetic pole position signal converting member 26 changes from 001 to 101, which time indicates a changing point to a next period of the sine wave, and decrements (−1) the count value of the rotation amount at the time when the binary digit signal changes from 101 to 001, and thereby it is possible to count a plurality of periods of the sine wave, namely the number of rotations of the servo motor 1.

The present position signal inputting member 30 receives an input of the present position signal detected by the position detecting member 2 of the servo motor 1 to count the number of rotations of the servo motor 1, inputs the present position signal to the reference magnetic pole position setting member 28, and inputs the counted number of rotations of the present position signal in a position comparing/correlating member 43.

The monitoring member 40 includes: a first speed calculating member 41 to obtain an operation speed of the servo motor 1 based on the magnetic pole position signal and the rotation amount input from the magnetic pole position calculating member 20; a second speed calculating member 42 to obtain the operation speed of the servo motor 1 based on the present position signal and the rotation amount input from the present position signal inputting member 30; a position comparing/correlating member 43 to compare the magnetic pole position signal and the rotation amount input form the magnetic pole position calculating member 20 with the present position signal and the rotation amount input from the present position signal inputting member 30 to output a position abnormal signal when an obtained difference is a previously set acceptable value or more; a speed comparing/correlating member 44 to compare the operation speed of the servo motor 1 obtained by the first speed calculating member 41 with the operation speed of the servo motor 1 obtained by the second speed calculating member 42 to output a speed abnormal signal when an obtained difference is a previously set acceptable value or more; and an OR circuit 45 to input the stop signal to cut off the power supply to the emergency stop switch 4 when one or both of the position abnormal signal and the speed abnormal signal is input.

By the above-described configuration, the servo motor monitoring apparatus 10 compares/correlates the position signal observed in the motor drive lines U, V, W with the present position by the detection by the position detecting member 4, which position input from the present position signal inputting member 30, to cut off the power supply to the driver 129 as a position abnormality in the case of disagreement.

Similarly, the speed based on the position signal observed in the motor drive lines U, V, W with the speed based on the present position input from the present position signal inputting member 30 are compared/correlated, and the power supply to the driver 129 is cut off as a speed abnormality in the case of disagreement. In both of the cases of the position abnormality and the speed abnormality, the power supply to the driver 129 is cut off.

By the above-described configuration, the servo motor control apparatus 100 can monitor the operation of the servo motor 1 without being influenced by a new configuration in the servo control section 120 such as a correction processing with respect to the instruction position, and thereby an abnormal occurrence can be detected surely at low cost with high reliability.

Incidentally, though an example where the rotator 11 and the permanent magnet 12 are used as the servo motor 1 of this embodiment is shown, a type of the servo motor 1 is not limited. For example, the servo motor using an electromagnet, not limited to the permanent magnet, and being excited through a rotary transformer may be used, and a servo motor where a permanent magnet is located in a fixed side and an armature winding is used as the rotator may be used. Moreover, a so-called linear motor where fixed-side permanent magnets are arranged linearly may be used. In any of the cases, the above-described monitoring apparatus can be applied.

Moreover, functions of all or a part of the magnetic pole position signal converting member 26, the rotation amount counting member 27, the reference magnetic pole position setting member 28, the first speed calculating member 41; the second speed calculating member 42; the position comparing/correlating member 43; the speed comparing/correlating member 44; and the OR circuit 45 can be realized by an arithmetic device using a software such as a microcomputer or by a hardware such as an analog circuit.

Second Embodiment

Servo Motor Monitoring Apparatus

Figure 6:
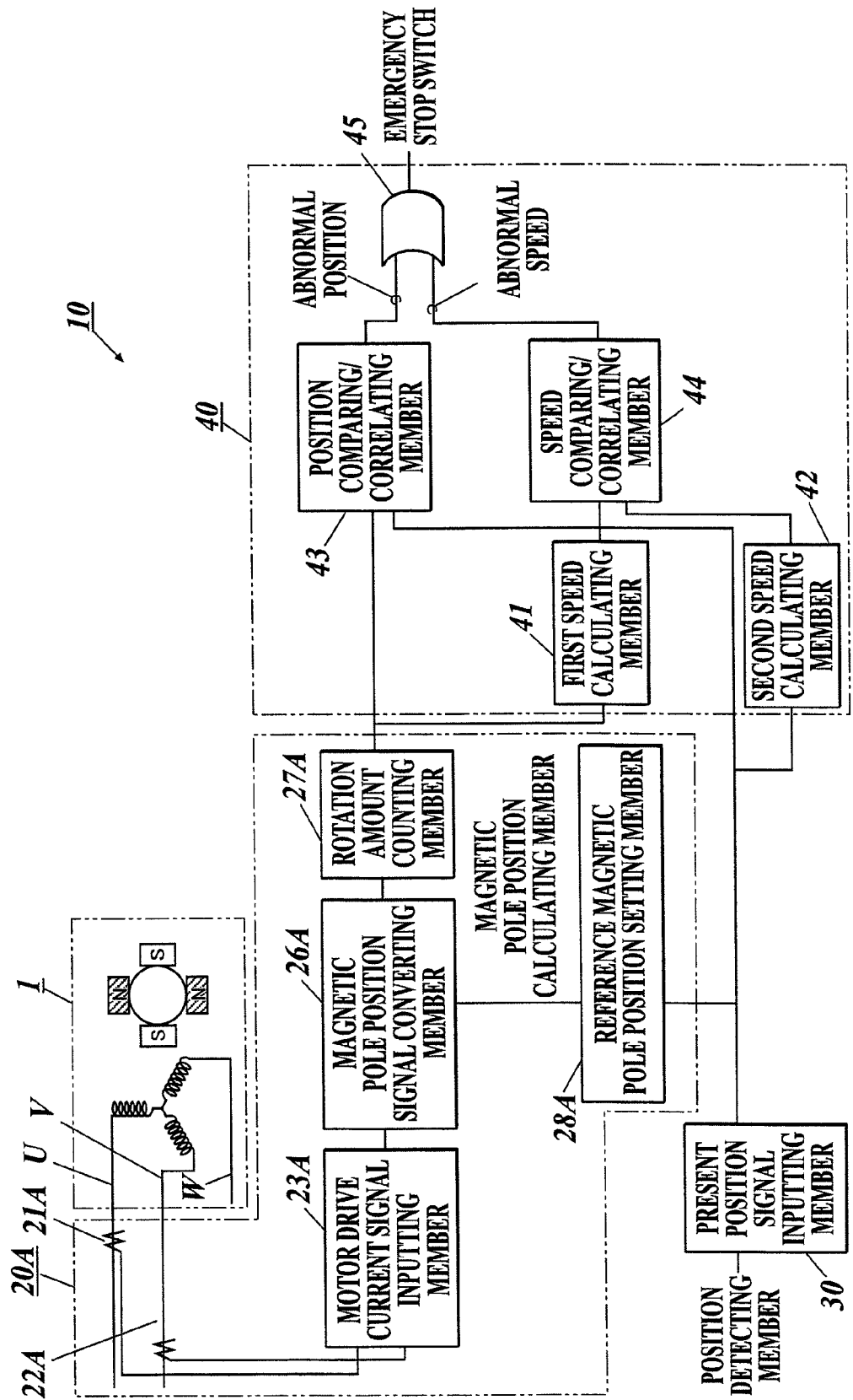
FIG. 6 is a configuration diagram showing a servo motor monitoring apparatus of a second embodiment.

A servo motor monitoring apparatus 10A of the second embodiment is shown in FIG. 6. The servo motor monitoring apparatus 10A has a configuration overlapping with that of the servo motor monitoring apparatus 10 previously described, except the magnetic pole position calculating member 20A, and can be equipped in the servo motor control apparatus 100 shown in FIG. 1.

With regard to the servo motor monitoring apparatus 10A, an explanation will be made on only the magnetic pole position calculating member 20A which is different from the servo motor monitoring apparatus 10.

The magnetic pole position calculating member 20A includes: shunt resistances 21A, 22A which are inserted into at least two of the motor drive lines U, V, W in series and are low-value resistances; a motor drive current signal inputting member 23A to obtain values of current flows through the motor drive lines U, V, W, based on voltage depressions of the shunt resistances 21A, 22A; a magnetic pole position signal converting member 26A to calculate a magnetic pole position θ based on the current value of each of the motor drive lines, which value is obtained by the motor drive current signal inputting member 23A; and a rotation amount counting member 27A to count the number of the rotation of the servo motor 1 by counting a changing point of periods of the magnetic pole position θ. The above-described shunt resistances 21A, 22A configure drive current detecting members.

When the three armature windings 13, 14, 15 of the servo motor 1 are located at 120 degree intervals around the rotator 11, motor drive currents IU, IV, IW respectively flowing through the motor drive lines U, V, W satisfy the following relations when the magnetic position is θ.

$$IU = K \cdot \sin \theta$$

$$IV = K \cdot \sin(\theta + 120°)$$

$$IW = K \cdot \sin(\theta + 240°)$$

Therefore, the motor drive current signal inputting member 23A detects two or more of the three motor drive currents IU, IV, IW, and the magnetic pole position signal converting member 26A obtains the magnetic position θ based on the motor drive current signal by an arithmetic operation.

Also in this case, similarly to the previously described case of the magnetic pole position signal converting member 26, the currents to flow at the time of acceleration and deceleration of the servo motor 1 are inverted each other and the angles thereof have a difference of 180 degree each other. For this reason, the reference magnetic pole position is obtained based on the present position obtained from the present position signal inputting member 30, and the magnetic pole position signal converting member 26A compares the obtained angle by calculating and the angle having 180 degree difference from the obtained angle with the reference magnetic pole position obtained from the present position to select the angle nearer to the reference magnetic pole position.

Then, the magnetic pole position and the rotation amount obtained by the magnetic pole position signal converting member 26A and the rotation amount counting member 27A are input into the position comparing/correlating member 43. Subsequent processing is same as that of the servo motor monitoring apparatus 10.

By this, the servo motor monitoring apparatus 10A can achieve advantages same as the previously described servo motor monitoring apparatus 10.

Incidentally, the shunt resistances 21A, 22A as magnetic pole position signal extracting members may be any other members as long as it extracts the current value from the motor drive lines U, V, W. For example, hall elements can be provided in at least two of the motor drive lines U, V, W to obtain the current value. Moreover, though the current values of only two of the motor drive lines U, V, W are detected in above-described example, the current values of all of the three lines can be detected to adopt an average value of three magnetic pole positions obtained from two combinations of two current values.

Furthermore, functions of all or a part of the magnetic pole position signal converting member 26A, the rotation amount counting member 27A, and the reference magnetic pole position setting member 28A can be realized by an arithmetic device using a software such as a microcomputer or by a hardware such as an analog circuit.

Third Embodiment

Robot Control Apparatus

Figure 7A:
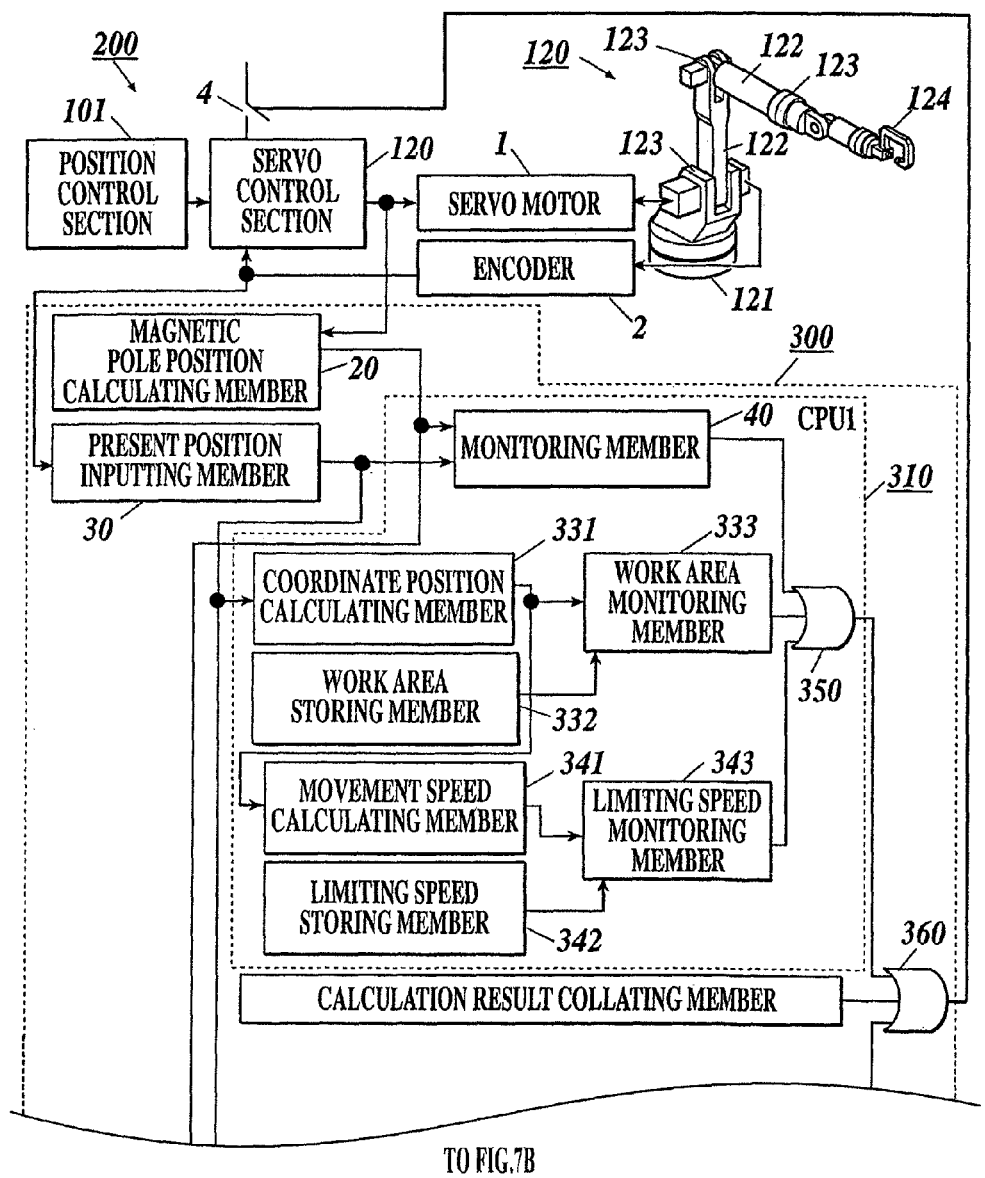
FIGS. 7A and 7B is a configuration diagram showing a robot control apparatus of a third embodiment.
Figure 7B:
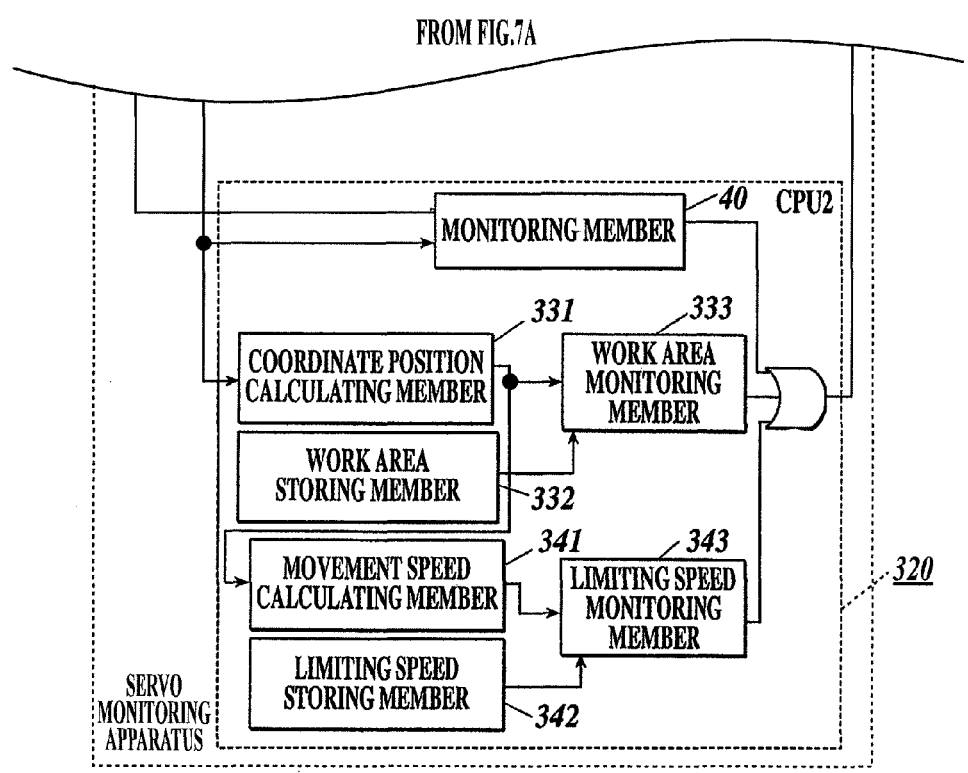

FIGS. 7A and 7B are a configuration diagram of a robot control apparatus 200 according to a third embodiment. The robot control apparatus 200 applies a new servo motor control apparatus provided with the basic configuration of the previously described servo motor control apparatus 100 to controls of a plurality of servo motors 1 provided in the robot 120, thus with respect to the previously-mentioned configuration regarding the servo motor control apparatus 100, same reference numbers is applied and an overlapping explanation is omitted.

The robot 120 includes: a base 121 which becomes a foundation; a plurality of arms 122 connected with joints 123 to one another; a servo motor 1 (only one servo motor 1 is shown in FIG. 7) as a drive source provided in each of the joints 123; a position detecting member (encoder) 2 to respectively detect an axis angle of each of the servo motor 1; and a tool 124 provided at most advanced portion of the connected arms 122.

The robot 120 is so-called multiple joint robot provided with six joints 123, and can allow the tool 124 positioned at most advanced portion (hereinafter referred to just as the "arm tip portion") of all of the arms 122 which are connected with the joints 123 to one another to locate at an arbitrary portion and to assume an arbitrary position.

The robot control apparatus 200 is provided with a servo control section 120 which performs a feedback control with respect to the six servo motors 1, and the position control section 101 calculates, for example, a movement trajectory for moving the tool 124 to a target position and an time-series instruction position with respect to each of the servo motor 1 for operating the robot 120 so as to follow the movement trajectory, and inputs them into the servo control section 120.

Moreover, the robot control apparatus 200 is provided with a servo motor monitoring apparatus 300 which monitors each of the servo motor 1.

The servo motor monitoring apparatus 300 includes: a magnetic pole position calculating member 20 to obtain a magnetic pole position and a rotation amount of each of the servo motor 1; a present position inputting member 30 to obtain a present position and the rotation number from the position detecting member 2 of each of the servo motor 1; two CPUs 310, 320 to monitor an operation of each of the servo motor 1 based on outputs of the magnetic pole position calculating member 20 and the present position signal inputting member 30; and a calculation result collating member 360 to output a stop signal for cutting off emergency stop switches 4 of all of the servo motors 1 when processing results of the two CPUs 310, 320 are different from each other.

The CPUs 310, 320 have same configurations to be explained below, and each of the configurations is embodied by execution of various programs stored in a memory which is not shown.

Specifically, each of the CPUs 310, 320 includes: a monitoring member 40; a coordinate position calculating member 331 to calculate a position of the tool 124 based on the present position of each of the servo motor 1; a work area storing member 332 to store an operable area or an inoperable area of the robot 120; a work area monitoring member 333 to output an instruction signal for cutting off a power supply to each of the servo motor 1 when the tool position calculated by the coordinate position calculating member 331 is outside of the operable area or inside of the inoperable area; a coordinate position calculating member to calculate a position of a predetermined region of the tool position based on the present position of each of the servo motor 1; a movement speed calculating member 341 to calculate a movement speed of the tool position based on a difference (difference between the tool position obtained based on the present position of each of the servo motor 1 and the tool position obtained based on the previously detected present position of each of the servo motor 1) of time-series data of the tool position; a limiting speed storing member 342 to store an upper limit of the movement speed at which the tool position of the robot 120 is operable; a limiting speed monitoring member 343 to output the instruction signal for cutting off the power supply to each of the servo motor 2 when the calculated movement speed of the tool position exceeds the upper limit of the operable movement speed; and an OR circuit 350 to input the instruction signal for cutting off the power supply into the calculation result collating member 360 when at least one of the monitoring member 40, the work area monitoring member 333, and the limiting speed monitoring member 343 outputs the instruction signal.

Then, when each of the CPUs 310, 320 respectively detects at least one of the case that the monitoring member 40 detects an emergency, the case that the operation of the robot 120 reaches unexpected area, and the case that the operation speed of the robot 120 exceeds the limiting speed, the instruction signal for cutting off the power supply to each of the servo motor 1 is input into the calculation result collating member 360.

On the other hand, when the instruction signals for cutting off the power supply to each of the servo motor 1 is input from both of the CPUs 310, 320, the calculation result collating member 360 inputs the instruction signals into the emergency stop switch 4 to stop all of the servo motors 1. When the instruction signal for cutting off the power supply is input from only one of the CPUs 310, 320, as a disagreement occurs in judgments of the emergency detections in the two CPUs 310, 320, the instruction signal for cutting off the power supply is input into the emergency stop switch 4 to stop all of the servo motors 1.

Incidentally, although the servo monitoring apparatus 300 monitors the tool position and the movement speed of the robot 120, not limiting to the tool position, a predetermined region (for example, a region which may touch with other objects, such as a bulge region of a motor fitting section) previously determined with respect to the robot 120 and an external surface position of approximated form obtained by approximating each of the arm 122 by the approximated form such as cylindrical shape may be monitored.

In the robot control apparatus 200, the calculation itself with respect to the operation area or the limiting speed of the monitoring member 40 or the robot is duplicated by the two CPUs 310, 320, and the calculation results of the two CPUs 310, 320 are collated to duplicate the servo motor monitoring apparatus 300.

By this, the operation of the servo motor 1 can be monitored without being influenced by the new configuration such as the correction processing with respect to the instruction position in the servo motor control section 120, and thereby it becomes possible to surely detect the case that the robot 120 using a plurality of servo motors 1 exceeds the set work area or enters the restricted operable area, at low cost with high reliability.

INDUSTRIAL UTILIZATION POSSIBILITY

As described above, the operation monitoring apparatus of the servo motor according to the present invention is suitable for detecting the abnormality detection of the servo motor when the position feedback control, speed feedback control, impedance control and the like are performed with respect to the servo motor used in operation of the robot and the like.

DESCRIPTION OF MARKS

1 servo motor
2 position detecting member
10, 300 servo motor monitoring apparatus
20 magnetic pole position calculating member
21 magnetic pole position signal extracting member
21A, 22A shunt resistance (drive current detecting member)
22 resistance bridge circuit
22a, 22b, 22c resistance element
23, 24, 25 comparator circuit
23A motor drive current signal inputting member
26, 26A magnetic pole position signal converting member
27, 27A rotation amount counting member
30 present position signal inputting member
40 monitoring member
41 first speed calculating member
42 second speed calculating member
100 servo motor control apparatus
120 robot
122 arm
123 joint
124 tool
200 robot control apparatus
310, 320 CPU (arithmetic processing section)
331 coordinate position calculating member
332 work area storing member
333 work area monitoring member
341 movement speed calculating member
342 limiting speed storing member
343 limiting speed monitoring member
360 calculation result collating member
U, V, W motor drive line

The invention claimed is:

1. A servo motor monitoring apparatus equipped in a servo motor control apparatus which controls a servo motor based on a present position detected by a position detecting member attached to the servo motor, the servo motor monitoring apparatus comprising:
   a magnetic pole position calculating member to extract a magnetic pole position signal of the servo motor from a motor drive line connected to the servo motor;
   a present position signal inputting member to receive an input of a present position signal of the present position from the position detecting member attached to the servo motor; and
   a monitoring member to monitor an operation of the servo motor based on two types of signals of which are the magnetic pole position signal and the present position signal of the servo motor, to compare the operation monitored based on the magnetic pole position signal with the operation monitored based on the present position signal, and to output a stop instruction signal for cutting off a power supply to the servo motor when detecting disagreement on the operation of the servo motor.

2. The servo motor monitoring apparatus according to claim 1, wherein the monitoring member includes a speed calculating member to calculate a speed of the operation of the servo motor based on a change of the magnetic pole position signal and a change of the present position signal, compares the obtained speeds speed calculated based on the change of the magnetic pole position signal with the speed calculation based on the change of the present position signal, and outputs the stop instruction signal for cutting off the power supply to the servo motor when detecting disagreement on the speed of the operation of the servo motor.

3. The servo motor monitoring apparatus according to claim 1, wherein the magnetic pole position calculating member includes:
   a magnetic pole position signal extracting member connected to the motor drive line; and a magnetic pole position signal converting member to convert the extracted magnetic pole position signal into a predetermined numerical value for specifying a motor axis angle.

4. The servo motor monitoring apparatus according to claim 3, wherein the magnetic pole position calculating member includes: a rotation amount counting member to count a rotation of a magnetic pole position indicated by the magnetic pole position signal as a rotation amount whenever the magnetic pole position takes a round.

5. The servo motor monitoring apparatus according to claim 3, wherein the magnetic pole position signal extracting member includes:
   a resistance bridge circuit composed of three resistance elements respectively connected to three motor drive lines; and
   a comparator circuit to convert a sine wave signal extracted from the resistance bridge circuit into a rectangular wave signal.

6. The servo motor monitoring apparatus according to claim 1, wherein the magnetic pole position calculating member includes:
   a motor drive current signal inputting member to obtain a motor drive current signal of a motor drive current flowing through the motor drive line; and
   a magnetic pole position signal converting member to obtain a magnetic pole position by an arithmetic operation from the motor drive current signal which is obtained from a sine function of the magnetic pole position.

7. The servo motor monitoring apparatus according to claim 6;
   wherein the magnetic pole position calculating member includes: a drive current detecting member to detect motor drive currents of at least two of three motor drive lines, and
   wherein the magnetic pole position signal converting member obtains the magnetic pole position by the arithmetic operation from the two motor drive current signals on the assumption that each of the motor drive currents respectively flowing through the three motor drive lines is the sine function of the magnetic pole position or a sine function of a position which varies from a magnetic pole position at constant phase intervals.

8. The servo motor monitoring apparatus according to claim 1 being equipped in a servo motor control apparatus which controls each servo motor of a robot including an arm section composed of a plurality of arms connected with one another by a plurality of joints, the servo motor provided in each of the joints, and a tool equipped at a tip of the arm section, the servo motor monitoring apparatus includes further comprising:
   a coordinate position calculating member to calculate a tool position of the tool or a position of a predetermined region of the arm section based on the present position signal of each of the servo motors;
   a work area storing member to store an operable area or an inoperable area of the robot; and
   a work area monitoring member to output an instruction signal for cutting off the power supply to each of the servo motors when the tool position or the position of the predetermined region calculated by the coordinate position calculating member reaches outside of the operable area or inside of the inoperable area.

9. The servo motor monitoring apparatus according to claim 1 being equipped in a servo motor control apparatus which controls each servo motor of a robot including an arm section composed of a plurality of arms connected with one another by a plurality of joints, the servo motor provided in each of the joints, and a tool equipped at a tip of the arm section, the servo motor monitoring apparatus further comprising:
   a coordinate position calculating member to calculate a tool position of the tool or a position of a predetermined region of the arm section based on the present position signal of each of the servo motor;
   a movement speed calculating member to calculate a movement speed of the tool position or the position of the predetermined region of the arm section based on a difference of time-series data of the tool position or the position of the predetermined region of the arm section;
   a limiting speed storing member to store an upper limit of the movement speed at which the robot is operable; and
   a limiting speed monitoring member to output an instruction signal for cutting off the power supply to each of the servo motors when the calculated movement speed of the tool position or the position of the predetermined region exceeds the upper limit of the movement speed at which the robot is operable.

10. The servo motor monitoring apparatus according to claim 8 further comprising a calculation result collating member,
   wherein the operation of at least one of the servo motors in monitored by two calculation processing sections of the servo motor monitoring apparatus individually, the calculation processing sections each of which includes the monitoring member, and
   wherein the calculation result collating member outputs an instruction signal for cutting off the power supply to each of the servo motors when at least one of the calculation processing sections detects an abnormality in the servo motor by the monitoring member.

* * * * *